Jan. 23, 1945.  R. L. ANDERSON ET AL  2,367,990
HARVESTER THRESHER
Filed July 29, 1940   5 Sheets-Sheet 4

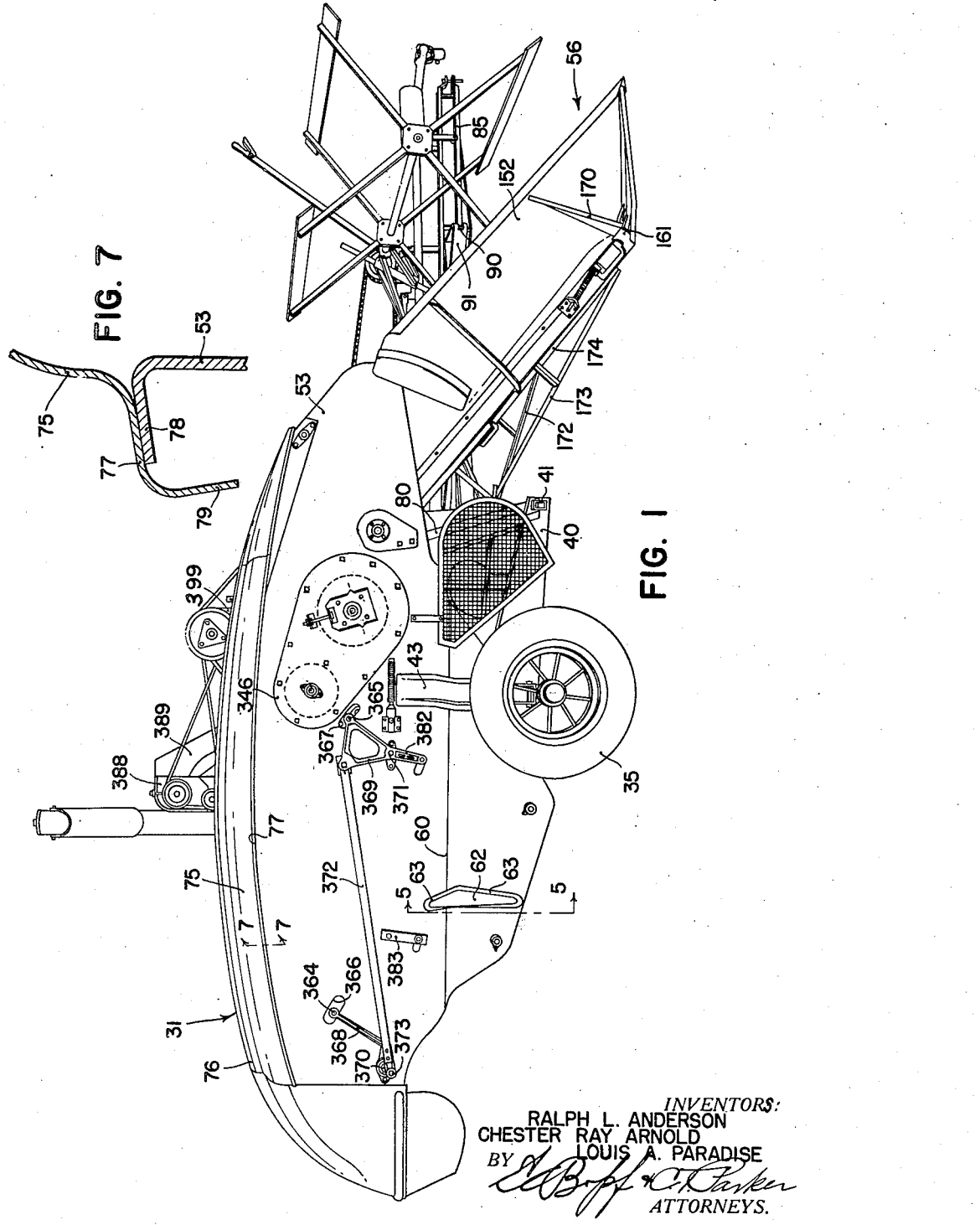

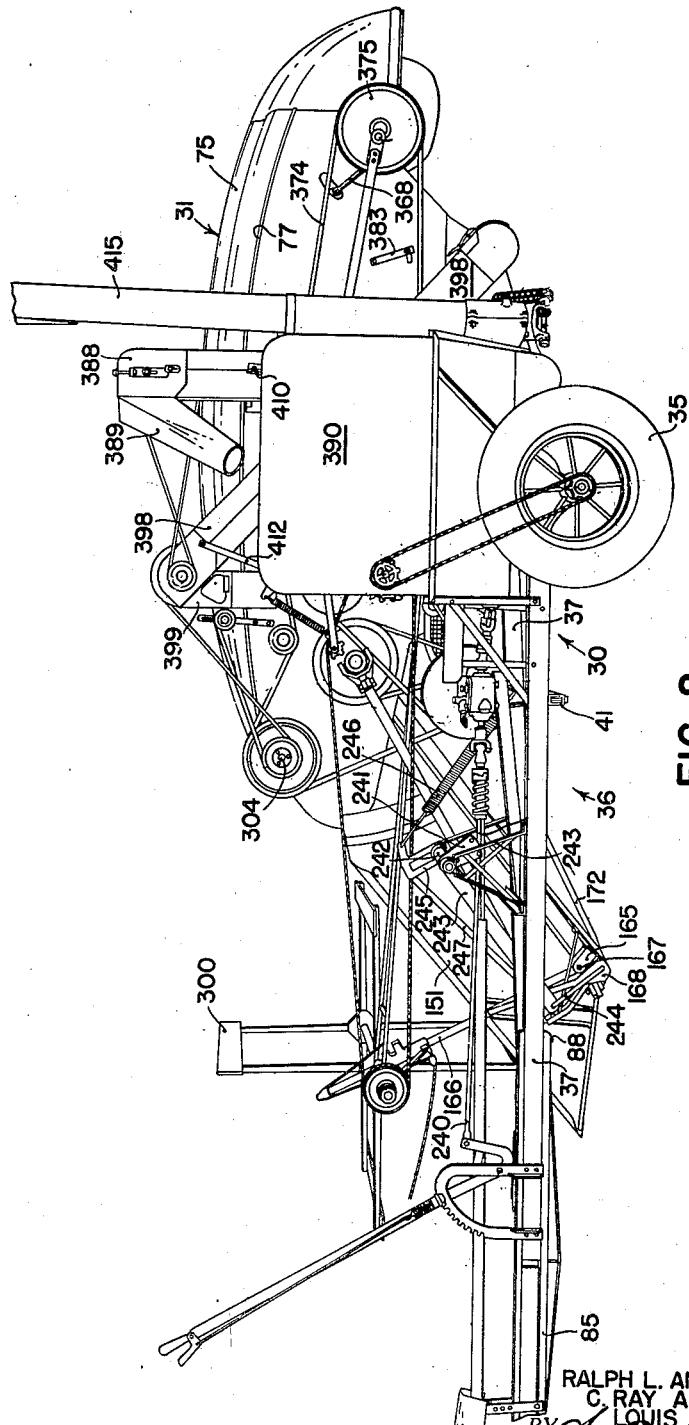

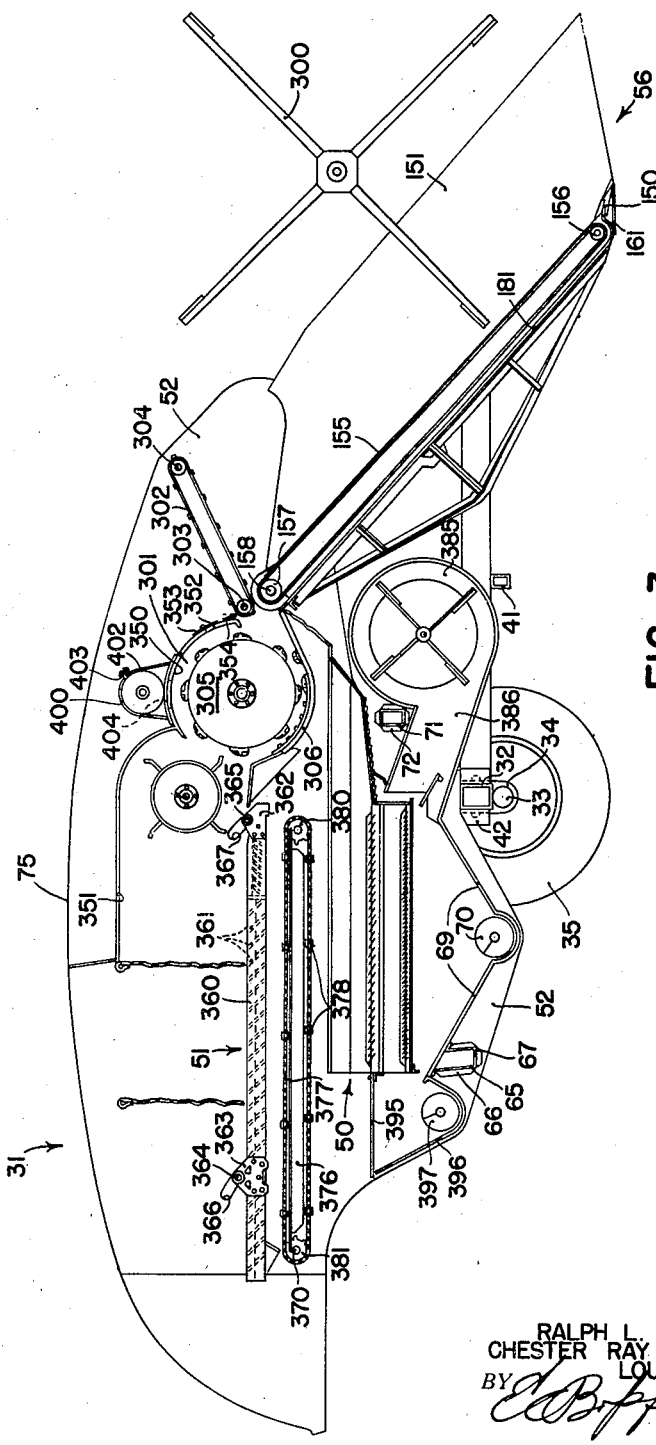

INVENTORS:
RALPH L. ANDERSON
CHESTER RAY ARNOLD
LOUIS A. PARADISE
BY
ATTORNEYS.

Jan. 23, 1945.  R. L. ANDERSON ET AL  2,367,990
HARVESTER THRESHER
Filed July 29, 1940  5 Sheets-Sheet 5
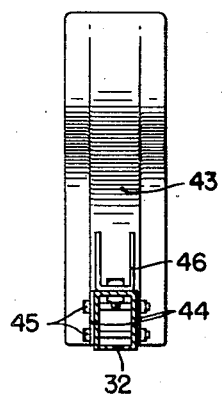
FIG. 8
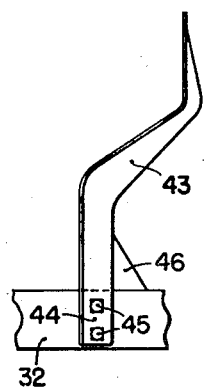
FIG. 9
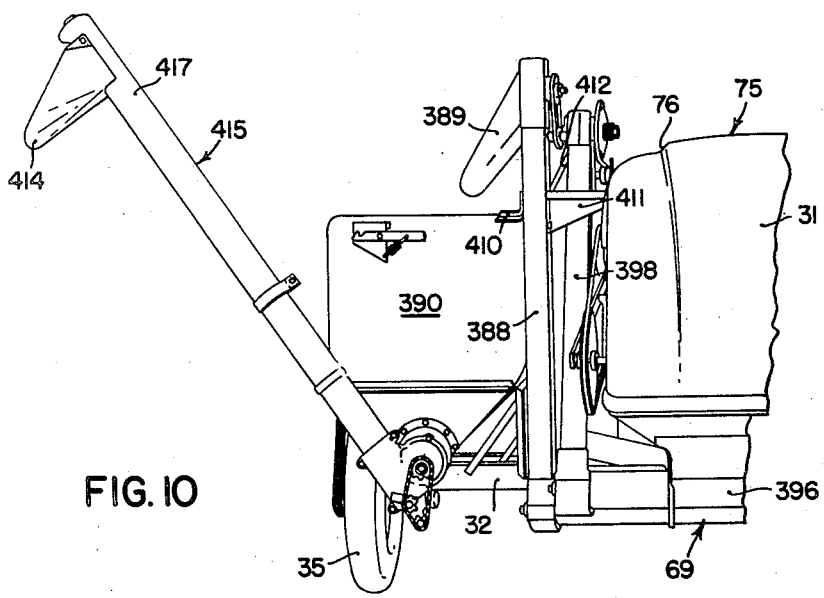
FIG. 10
*INVENTORS*
RALPH L. ANDERSON, CHESTER RAY-
ARNOLD & LOUIS A. PARADISE
BY
ATTORNEYS Patented Jan. 23, 1945

2,367,990

UNITED STATES PATENT OFFICE 2,367,990

HARVESTER THRESHER

Ralph L. Anderson, Chester Ray Arnold, and Louis A. Paradise, Moline, Ill., assignors to Deere & Company, Moline, Ill., a corporation of Illinois Application July 29, 1940, Serial No. 348,128

8 Claims. (Cl. 130—27)

The present invention is related to harvester threshers and has for its principal object the provision of a novel and improved harvester thresher or combine that is small and compact in size but has a large capacity and is efficient in operation.

One of the more specific objects of this invention relates to the provision of a novel frame for supporting and bracing the harvesting and threshing mechanism, and which is light in weight but strong and durable. A related object relates to the provision of a novel frame construction having sheet metal braces for bracing and supporting the body of the combine. A further related object has to do with the provision of a novel frame for the harvester platform which is light in weight but strong and durable. Another object is concerned with the provision of a novel body formed of sheet metal and welded together in a novel manner.

These and other objects relating to further improvements in the details of construction of the various parts of the harvester thresher, will be made apparent by a consideration of the following description in which reference is made to the drawings appended to this specification, in which Figure 1 is a side view in perspective of a harvester thresher embodying the principles of our invention, taken from the grainward side of the machine;

Figure 2 is a perspective view of the opposite side of the machine;

Figure 3 is a side elevation taken from the grainward side of the machine with the side wall and grainward wheel of the combine removed to show the details of the operating mechanism in the machine;

Figure 7 is an enlarged scale sectional elevational view taken along a line 7—7 in Figure 1 and showing the detail of the joint between the combine roof and body walls;

Figure 8 is an elevational view of the inside of one of the body supporting arms, drawn to an enlarged scale;

Figure 9 is a rear elevational view of the arm shown in Figure 8;

Figure 10 is a rear view in perspective of the stubbleward portion of the combine.

Throughout the drawings and description, like reference numerals will refer to like parts.

Figure 5:
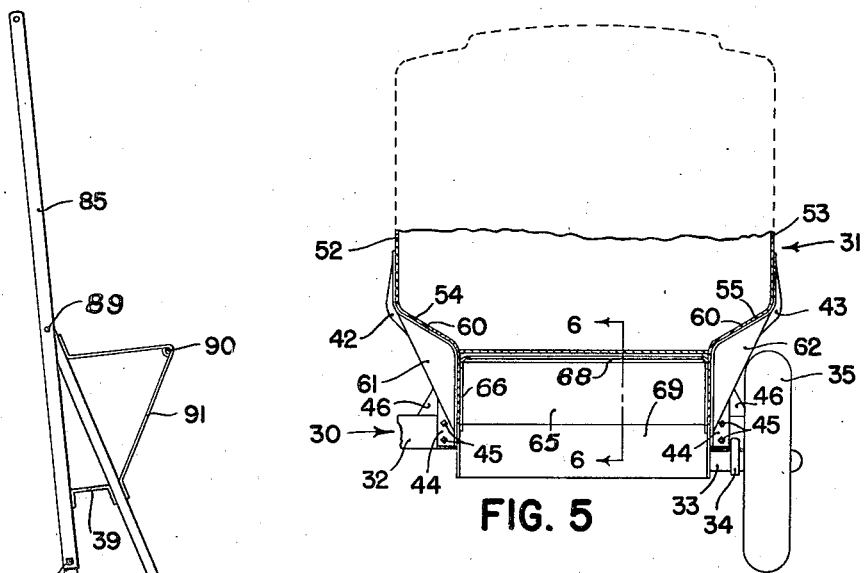
Figure 5 is a fragmentary sectional elevational view of the frame and body of the combine, taken along a line 5—5 in Figure 1.
Figure 6:
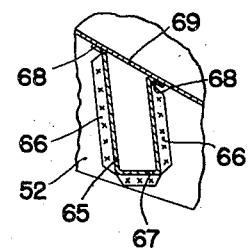
Figure 6 is an elevational sectional view of the transverse body brace taken along a line 6—6 in Figure 5, and drawn to an enlarged scale.
Figure 4:
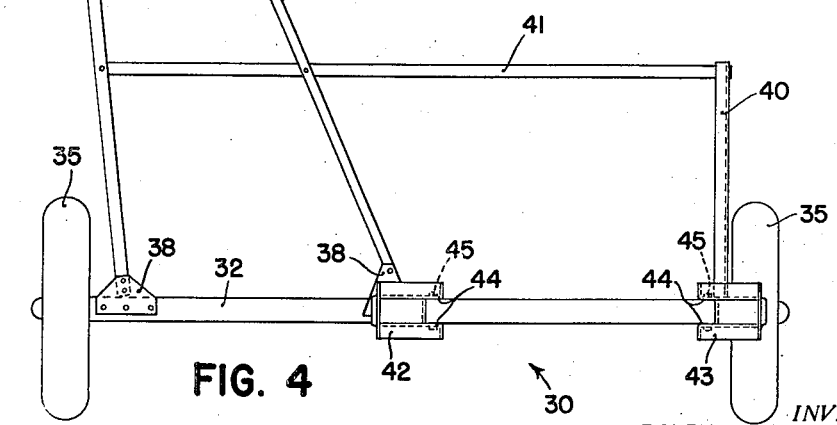
Figure 4 is a plan view of the supporting frame and draft member of the combine.

Referring now to the drawings and more particularly to Figures 1 to 6, inclusive, the combine comprises a structural supporting frame, indicated in its entirety by reference numeral 30, and a body 31 comprising mainly of a sheet metal housing supported on the supporting frame 30. The supporting frame 30 includes a main transverse supporting axle member 32, preferably of rectangular box section at the opposite ends of which a pair of stub axles 33 are rigidly connected by means of brackets 34. A pair of laterally spaced ground engaging wheels 35 are journaled on the ends of the stub axles 33, respectively. A draft frame 36 extends forwardly from one end of the axle 32 and comprises a pair of forwardly and outwardly converging beams 37 connected at their rear ends to the axle 32 at laterally spaced positions by means of gusset plates 38 and converging forwardly to an apex just outside of the stubbleward wheel 35 where they are connected together, as by bolts, and also by suitable cross bracing means 39. Adjacent the inner side of the grainward wheel 35, a forwardly extending body supporting arm 40 is fixed to the main axle beam 32, and is connected to the draft frame 36 by means of a transversely extending beam 41.

The body 31 is supported on the axle 32 and is secured thereto by means of a pair of supporting arms 42, 43, which are formed to closely embrace the sides of the body 31 and are provided at their lower ends with a bifurcated supporting shank having legs 44 which extend in front of and in back of the main axle member 32 and are rigidly connected thereto by bolts 45 and are braced laterally by diagonal braces 46.

The lower part of the body 31 contains the grain cleaner shoe 50 and is appreciably narrower than the upper part of the body, which encloses the straw rack 51 and threshing mechanism, which will be described later. Hence, the body 31 comprises a pair of side walls 52, 53, which slope upwardly and outwardly, as at 54, 55, between the lower and upper parts of the body. The upwardly and outwardly diverging arms 42, 43 are shaped to fit under the sloping body portions 54, 55, and are rigidly fixed thereto, as by welding, to provide a rigid support for the body.

The combine includes a harvester platform 56, which is supported on the front end of the body by means which will be described later, and extends forwardly therefrom. The axle member 32 is located slightly to the rear of the center of gravity of the body and platform of the combine so that while the machine is substantially balanced on the axle, a portion of the weight is carried on the drawbar of the tractor to which the forward end of the draft tongue is connected during operation.

Each of the side walls 52, 53 of the body 31 is formed in two upper and lower longitudinally extending sections to facilitate manufacture, which are joined together along a line of division indicated by reference numeral 60. The outwardly and upwardly inclined portions 54, 55 of the side walls are rigidly braced by means of a pair of opposed external braces 61, 62, respectively, which subtend the angles between each of the vertical and inclined wall portions. Each of the braces 61, 62 comprises a metal sheet bent into a U shape and disposed with its sides in substantially parallel planes perpendicular to the wall of the body and fixed thereto, with the rounded edge of the bracing member facing outwardly. The inner edges of the bracing members 61, 62 are provided with outwardly turned flanges 63 adapted to fit in juxtaposition with the under side of the sloping portions 54, 55, respectively, and with the outer sides of the lower portions of the side walls 52, 53, and the flanges 63 are fastened to the side walls by any suitable means, such as spot welding. The inner sides of the side walls 52, 53 are interconnected at the lower portion of the body by means of a transverse sheet metal member 65, best shown in Figures 3, 5 and 6. The transverse brace 65 is provided with outwardly turned end flanges 66 at opposite ends thereof, which are welded or otherwise secured to the insides of the side walls of the body, in transverse alignment with the external braces 61, 62. The closed edge 67 of the U-shaped transverse brace 65 faces downwardly and the two upper edges of the member 65 are turned outwardly to provide top flanges 68 which are adapted to fit against the under side of the grain trough 69, which slopes upwardly and rearwardly between the side walls 52, 53 from the clean grain auger 70.

Another transverse bracing member 71 is disposed between the inner walls of the body ahead of the main axle 32 and beneath the forward end of the grain shoe 50. This brace 71 also has outwardly turned flanges 72 at each end thereof, which are welded or otherwise fixed to the inside surfaces of the side walls 52, 53, respectively. We have found that sheet metal braces, such as those described above, 61, 65, 71, produce an extremity rigid combine body which is exceptionally light in weight and is simple and inexpensive to manufacture.

The two upper edges of the side walls 52, 53 are interconnected and braced by means of a unitary sheet metal roof 75, which is arched from one wall 52 to the other 53, transversely of the combine, and also curved in a long arch longitudinally of the body, thus providing not only protection for the mechanism within the body but also serves as a bracing and stiffening member for the entire body. Additional strength in the roof 75 is provided by a raised portion 76 extending longitudinally from the center of the roof arch.

The roof 75 is provided with outwardly turned, generally horizontal flanges 77, which extend longitudinally along opposite edges of the roof and support the latter by resting upon outwardly turned flanges 78 on the upper edges of the body side walls 52, 53, respectively. The outer edges 79 of the roof flanges 77 extend beyond the outer edges of the wall flanges 78 and are turned downwardly over the latter. The roof is fixed to the side walls by securing the two flanges 77, 78 rigidly together, preferably by means of spot welding.

The body 31 is prevented from twisting about the axle 32 by means of a supporting leg 80, which extends downwardly from the forward part of the body ahead of the axle and is supported on the transverse brace 41. A similar leg (not shown) supports the inner forward corner of the body on the transverse brace 41 and thus the body is made a unitary part of the rigid structural frame, and is tiltable about the axis of the wheels 35 by raising and lowering the draw frame 36.

The forward end of the draw frame 36 is adapted to be connected to the drawbar of a tractor by means of a draft tongue 85, pivotally connected to the beam 37 by means of a vertically disposed bolt 88, and thus providing for lateral swinging movement of the draft tongue 85 relative to the frame 36. In normal operation, the draft tongue 85 extends forwardly in alignment with the outer draft beam 37 and is fixed thereto by means of a second vertical bolt 89 for towing the combine behind the tractor in offset relation on the right-hand side thereof. When the combine is being transported from one field to another, however, along narrow roads through narrow gates, it is desirable that the machine trail directly behind the tractor and at such times the draft tongue is swung laterally to the right about the pivot bolt 88 after the securing bolt 89 has been removed. The draft tongue 85 can be fixed relative to the draft frame 36 in transport position by inserting the bolt 89 through a loop 90 provided in a bracket member 91 fixed to the grainward side of the draft frame 36 and secured to the inner draft beam 37 of said frame. The draft device and power connections are disclosed and claimed in our copending application, Serial No. 416,938, filed October 29, 1941, to which reference may be made for a more complete description.

The harvester platform 56 projects downwardly and forwardly from the front end of the body 31 and has a cutter bar 150 disposed transversely across the forward end thereof, and since the cutter bar is conventional in construction, there is no need to describe the same in detail. Vertically disposed side walls 151, 152 are carried on the platform at opposite sides thereof, respectively. Harvested crops are conveyed from the cutter bar upwardly and rearwardly to the threshing mechanism in the body of the machine by means of a flexible endless draper 155 trained around a pulley or roller 156 at the forward end of the platform just behind the cutter bar 150 and an upper roller 157 journaled at the upper end of the platform 56, for rotation about the axis of the shaft 158. As will be described later, the platform 56 is pivotally supported for vertical swinging movement about the transversely disposed axis of the shaft 158.

The platform 56 is raised and lowered to adjust the height of cut by means of the lever 140, the details of which have been described. The lever 140 is connected by means of a rearwardly extending link 240 which is connected at its rearward end to an arm 241 on a rock shaft 242. The rock shaft 242 is journaled in a supporting frame 243 which stands upon the draft frame 36 and spans between the two draft beams 37. A forwardly extending arm 243 is rigidly fixed to the transversely disposed rock shaft 242 and extends downwardly and forwardly therefrom. The forward end of the arm 243 is connected by a link 244 to the supporting and lifting plate 168 which is fixed at the outer end of the extension 164 on the cutter bar supporting member 161. The weight of the platform is balanced by means of a counterbalancing spring 246 which is connected to an upwardly extending arm 245 fixed on the rock shaft 242 adjacent the lifting arm 243. The other end of the spring 246 is anchored on the draft frame 36 at a point rearward of the rock shaft 242. The arm 243 is braced by a diagonally extending brace 247 connected between the outer ends of the two arms 243, 245.

The cutting mechanism 150 is driven from the roller shaft 158 by mechanism disclosed in detail and claimed in Patent 2,297,317, issued September 29, 1942, to Paradise and Anderson.

The grain which is severed by the sickle is laid upon the canvas conveyor 155 by a harvester reel 300, the details of which are not important in the present invention, and the conveyor 155 delivers the grain at its upper end to the threshing mechanism 301. An auxiliary upper draper 302 is mounted between the side walls 52, 53 of the combine body 31 and is trained over a pair of rollers 303, 304. The threshing mechanism 301 comprises a rotatable threshing cylinder 305 and a threshing concave 306 disposed beneath the cylinder 305.

The cylinder is readily adjustable relative to the concave by adjusting mechanism described in detail in Patent 2,318,188, issued May 4, 1943, to Anderson and Arnold.

A beater or stripping cylinder 340 is mounted for rotation about an axis spaced rearwardly and upwardly from the axis of rotation of the threshing cylinder 305 and comprises an imperforate cylindrical rotor 341 upon which are mounted a plurality of outwardly extending fingers or pegs 342 which pass closely adjacent to the bars of the cylinder 305 for the purpose of stripping off any harvested material that tends to cling thereto and to pass the same rearwardly upon the straw rack 51.

A concave wall or partition 350 is disposed within the body housing 31 directly above the threshing cylinder 305 and also arches rearwardly over the separating cylinder 340, as at 351. The wall 350 is provided with a forward section 352 which is connected to the wall 350 by hinges 353 permitting the forward section 352 to be swung upwardly to provide access for cleaning out the cylinder in case of clogging with heavy weeds or the like. This hinged forward end 352 is provided with suitable means for latching the same in normal operating position. A flexible flap 354 is secured to the lower edge of the front section 352 and lightly drags upon the upper run of the flexible draper 302 to discourage any material from being carried forwardly over the top of the draper.

Inasmuch as the straw separating and grain cleaning mechanism forms no part of the present invention, only a brief description of the same will be given at this time. The straw rack 51 comprises a generally rectangular frame 360 in which are supported a plurality of slots 361 upon which the straw is tossed by the reciprocating action of the straw rack, the latter being mounted upon a pair of front and rear brackets 362, 363 connected to shafts 364, 365 which extend outwardly through the sides 52, 53 of the body through elongated slots 366, 367, respectively, and are journaled on a pair of crank arms 368, 369 which are swingably supported on the sides of the body 31 on pivot shafts 370, 371, respectively. The rack 51 is reciprocated by means of a pitman 372 which is connected to the crank arm 369 and to a crank 373 on the shaft 370. The shaft 370 is driven at uniform speed by a V-belt drive 374 through a pulley 375 on the stubbleward side of the machine, see Figure 2.

Under the straw rack 51 is an imperforate table 376 supported between the side walls 52, 53 of the body and over which moves an endless raddle chain 377 having transverse slats 378 which scrape the grain and chaff which is separated from the straw, forwardly over the table 376 and discharged at the forward end of the table upon the forward portion of the grain cleaning shoe 50. The raddle chain 377 is trained over a pair of front and rear rollers 380, 381, the rear roller 381 being fixed to the transverse shaft 370 and is driven thereby.

The shoe 50 is supported on a downward extension 382 of the crank arm 369 at its forward end, and upon an arm 383 at its rearward end which is swingably supported on each of the side walls 52, 53, respectively. The shoe 50 is of more or less conventional construction, the details of which are not pertinent to this invention, and extends forwardly under the concave 306 to receive any kernels of grain which are discharged through suitable openings provided in the concave.

A blower fan 385 is supported beneath the body 31 and behind the platform 56 on the transverse beam 41 and has a rearwardly extending discharge duct 386 which directs a blast of air upwardly through the cleaning shoe 50 and out the rear end of the body for separating chaff from the grain. The grain falls through the shoe to a grain trough 69 having downwardly sloping sides over which the grain slides into a transversely extending auger conveyor 70 which conveys the kernels of grain stubblewardly to a grain elevator 388 and which discharges the clean grain through a spout 389 to a grain storage tank 390 which is supported on the frame 30 directly above the axle beam 32. The remainder of the material on the shoe 50 passes over a grate 395 through which the tailings are discharged to a tailings trough 396 in which is disposed a transversely extending tailings auger 397 which conveys the tailings stubblewardly to a tailings elevator 398. The tailings elevator extends upwardly and forwardly along the side of the body and discharges the tailings through a down-spout 399 to a laterally extending auger housing 400 in which is disposed an auger conveyor (not shown) which conveys the tailings inwardly to a point of discharge above the center of the threshing cylinder. In order to facilitate assembly of the combine, the housing of the tailings elevator 398, the down-spout 399, and the housing 400 of the auger conveyor, are made separately in one unitary rigid L-shaped structure which is installed by inserting the end of the auger conveyor housing 400 through a suitable opening in the body wall 52, and the end of the auger conveyor housing 400 is received within a cylindrical sheet metal member 402 which is attached to the top of the concave wall 350 and clamps around the conveyor housing 400 by means of clamping bolts 403. The conveyor housing 400 is provided with a suitable discharge opening (not shown) at the end thereof, which is secured by the clamping member 402 in register with the discharge opening 404, see Fig. 3, in the wall 350 above the cylinder. The inner end of the auger conveyor in the housing 400 is journaled in a bearing 405 which is fixedly supported on the end of the housing 400. The outer end of the conveyor shaft 406 extends out of the housing 400 and is driven by a suitable V-belt pulley 407 mounted thereon.

The body 31 and tank 390 of the combine are effectively braced by interconnecting them through the housing of the grain elevator 388, and thus tying all parts together into a rigid unitary structure. This is accomplished by means of an angular bracket 410 rigidly bolted to the grain tank 390 and to the elevator 388 on one side of the latter, and a bracing member 411 is connected rigidly to the opposite side of the elevator 388 and to the side wall 52 of the body 31. The tailings elevator 398 is rigidly braced to the tank 390 by means of a bracing member 412.

The threshed grain in the grain tank 390 is unloaded into a truck or wagon through a wagon elevator 415 which comprises an auger conveyor (not shown) disposed within a tubular housing 417 through which the grain is raised and discharged into a spout 414 into the wagon (not shown), which is drawn up alongside the combine for the purpose of loading the grain therein.

We do not intend our invention to be limited to the details exactly as shown and described herein except as limited by the claims which follow.

We claim:

1. In a harvester body comprising a pair of laterally spaced side walls, each having a generally vertical portion and an outwardly and upwardly inclined portion, a grain trough extending between said walls a pair of opposed external braces subtending the angle between each of said vertical and inclined wall portions, each of said braces comprising a U-shaped sheet metal member having flanges adapted to lie against the outsides of said wall portions and secured thereto, and a transverse sheet metal member interconnecting said side walls, said interconnecting member being U-shaped in cross section and secured at its opposite ends to the insides of said side walls, respectively, in general transverse alignment with said external braces and having flanges along its longitudinal edges fixed to said grain trough for supporting the latter and distributing the weight thereof through said braces to said walls.

2. A harvester body comprising a pair of opposed sheet metal side walls, the upper edges of which are turned outwardly to provide supporting flanges, and an arched sheet metal roof, the longitudinal edges of which are turned outwardly to form flanges along the sides adapted to lie upon said wall flanges and fixed thereto and serving as the sole support for said arched roof, said roof sheet serving as the sole brace between the upper edges of the side walls to provide a rigid frameless self-supporting body, the outer edges of said roof flanges extending beyond said wall flanges and being turned downwardly outside the latter.

3. In a harvester having a transverse wheel supported beam, the combination of a longitudinally extending sheet metal body housing mounted on said beam and having outwardly and upwardly diverging sides, and a pair of laterally spaced sheet metal arms provided at their lower ends with bifurcated shanks adapted to straddle said beam and to be rigidly fixed thereto and offset center web sections connecting said shanks and having lower edges between said shanks disposed to bear upon the top of said beam transversely of the latter and in laterally offset relation to said shanks to brace said arms against outward bending, said arms extending upwardly in diverging relation embracing said sides of the body housing.

4. In a harvester having a transverse wheel supported beam, the combination of a longitudinally extending sheet metal body housing mounted on said beam and having upper and lower housing portions, the upper portion being wider than said lower portion and connected thereto by outwardly extending wall sections, and a pair of laterally spaced sheet metal arms provided at their lower ends with bifurcated shanks adapted to straddle said beam and to be fixed rigidly thereto and offset center web sections having lower edges extending transversely across said beam between said shank and disposed to bear upon the top of said beam in laterally offset relation to said shanks to brace said arms against outward bending, said arms extending upwardly embracing the sides of said lower housing portion, diverging outwardly along said outwardly extending wall sections, and having upper ends embracing said upper housing portion.

5. A harvesting machine comprising a transverse supporting axle, wheels journaled thereon, a longitudinally extending sheet metal body mounted on said axle in substantially fore and aft balanced position, said body comprising a lower grain cleaning portion having generally vertical side walls, an upper separating portion appreciably wider than said cleaning portion and having generally vertical side walls, and a pair of inwardly inclined walls connecting the side walls of said upper and lower sections, respectively, and a pair of laterally spaced arms fixed to said axle and extending upwardly embracing said lower portion side walls, diverging outwardly beneath said inclined walls, and extending vertically to embrace the side walls of said upper portion and thereby not only forming a supporting cradle for said body, but also serving to appreciably relieve the weight of said wide upper portion from said narrow lower portion.

6. A harvesting machine comprising a transverse supporting axle, wheels journaled thereon, a longitudinally extending sheet metal body mounted on said axle in substantially fore and aft balanced position, said body having a comparatively wide upper portion with vertical sides, a downwardly converging portion, and a comparatively narrow lower portion with vertical sides, said converging portion serving to direct grain from separating mechanism in said upper portion inwardly and downwardly upon cleaning mechanism in said lower portion, and a pair of laterally spaced arms fixed to said axle and extending upwardly embracing said lower portion side walls, diverging outwardly beneath said converging portion and extending vertically to embrace the side walls of said upper portion and thereby not only forming a supporting cradle for said body, but also serving to appreciably relieve the weight of said wide upper portion from said narrow lower portion.

7. A harvesting machine comprising a transverse supporting axle, wheels journaled thereon, a longitudinally extending sheet metal body mounted on said axle in substantially fore and aft balanced position, said body having a comparatively wide upper portion with vertical sides, a downwardly converging portion, and a comparatively narrow lower portion with vertical sides, said converging portion serving to direct grain from separating mechanism in said upper portion inwardly and downwardly upon cleaning mechanism in said lower portion, a pair of laterally spaced arms fixed to said axle and extending upwardly embracing said lower portion side walls, diverging outwardly beneath said converging portion and extending vertically to embrace the side walls of said upper portion and thereby not only forming a supporting cradle for said body, but also serving to appreciably relieve the weight of said wide upper portion from said narrow lower portion a grain trough in the lower portion of said body, and a sheet metal bracing member of U-shaped cross section spaced rearwardly from said axle and having flanges at opposite ends attached to said side walls, and flanges along the longitudinal edges fixed to the bottom of said grain trough.

8. A harvesting machine comprising a transverse supporting axle, wheels journaled thereon, a longitudinally extending sheet metal body mounted on said axle in substantially fore and aft balanced position, said body having a comparatively wide upper portion with vertical sides, a downwardly converging portion, and a comparatively narrow lower portion with vertical sides, said converging portion serving to direct grain from separating mechanism in said upper portion inwardly and downwardly upon cleaning mechanism in said lower portion, a pair of laterally spaced arms fixed to said axle and extending upwardly embracing said lower portion side walls, diverging outwardly beneath said converging portion and extending vertically to embrace the side walls of said upper portion and thereby not only forming a supporting cradle for said body, but also serving to appreciably relieve the weight of said wide upper portion from said narrow lower portion, said arms provided at their lower ends with bifurcated shanks adapted to straddle said beam and to be rigidly fixed thereto and offset center web section having lower edges between said shanks disposed transversely of said beam to bear upon the top of said beam in laterally offset relation to said shanks to brace said arms against outward bending.

RALPH L. ANDERSON.
CHESTER RAY ARNOLD.
LOUIS A. PARADISE.